US007949715B2

(12) United States Patent
Maruyama (10) Patent No.: US 7,949,715 B2
(45) Date of Patent: May 24, 2011

(54) METHOD, SERVER AND PROGRAM PRODUCT FOR DELIVERING MESSAGES

(75) Inventor: Keiichi Maruyama, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 1492 days.

(21) Appl. No.: 11/360,968

(22) Filed: Feb. 23, 2006

(65) Prior Publication Data

US 2007/0055733 A1 Mar. 8, 2007

(30) Foreign Application Priority Data

Mar. 9, 2005 (JP) ................................. 2005-066235

(51) Int. Cl.
*G06F 15/16* (2006.01)
(52) U.S. Cl. ........................................................ 709/206
(58) Field of Classification Search .................... 709/206
See application file for complete search history.

(56) References Cited

U.S. PATENT DOCUMENTS

| 2002/0156854 A1* | 10/2002 | Matsumoto | 709/206 |
| 2006/0031328 A1* | 2/2006 | Malik | 709/206 |
| 2007/0005762 A1* | 1/2007 | Knox et al. | 709/224 |

FOREIGN PATENT DOCUMENTS

| JP | 2002099567 | 4/2002 |
| JP | 2002-298007 | 10/2002 |
| JP | 2002334104 | 11/2002 |
| JP | 2003162482 | 6/2003 |
| JP | 2003295804 | 10/2003 |
| JP | 2004213361 | 7/2004 |

* cited by examiner

*Primary Examiner* — John Follansbee
*Assistant Examiner* — Alan S Chou
(74) *Attorney, Agent, or Firm* — Shimokaji & Associates, P.C.

(57) ABSTRACT

There is provided a method, a system and a program product for delivering on-target messages needed for a user, without omissions. A method for delivering a plurality of delivery messages in a delivery message database to one or more clients, comprising the steps of: delivering one or more delivery messages for a first delivery which are extracted from the delivery message database to at least one of the one or more clients, monitoring reading statuses of each of the one or more delivery messages for the first delivery, generating correlation data indicating a correlation between the plurality of delivery messages based on a result of monitoring the reading statuses, and delivering one or more delivery messages for a second delivery which are not included in the one or more delivery messages for a first delivery and are extracted from the delivery message database based on the correlation data.

5 Claims, 7 Drawing Sheets

PREFERENCE CATEGORY OF ALICE

| CATEGORY 1 | O |
| --- | --- |
| CATEGORY 2 | × |
| CATEGORY 3 | × |
| CATEGORY 4 | × |

METHOD, SERVER AND PROGRAM PRODUCT FOR DELIVERING MESSAGES

FIELD OF THE INVENTION

The present invention relates to a method, a system and a program product for delivering messages in an information processing system, and particularly to a method, a system, and a program product for delivering messages to clients via a communication network.

BACKGROUND OF THE INVENTION

There has conventionally been known a technology (mail magazine or the like) for delivering news articles and information, which are recorded on a server in an information processing system, to a plurality of clients. Here, as a message to be delivered, it is desirable to be able to deliver message contents which are interesting for users and are responding to high needs of users.

For that purpose, there is known a method that a user receiving the message registers in advance a category regarding message contents that the user wants to receive, on the server for delivering the messages. In other words, there is known a method of delivering only information falling under the category having been registered in advance, to this user as delivery messages. For example, see Japanese Unexamined Patent Publication (Kokai) No. 2003-295804.

However, according to the method of Kokai, if the user registers many categories, many messages may be delivered to the user according to the number of registrations thereof. On the contrary, if the registered category is reduced in number, there may arise a possibility that the information that the user wants to obtain may not sufficiently be delivered. In practice, since there may be a case in which it may be delicately difficult to determine under which category the contents of the information to be delivered may fall, there may arise a case where enough information to satisfy the user cannot be provided as delivery messages, by depending only on the category for determining whether or not the message should be delivered.

It is therefore an object of the present invention to provide a method, a system and a program product for delivering on-target messages needed for a user, without omissions.

To achieve the objectives, there is provided a method for delivering a plurality of delivery messages in a delivery message database to one or more clients, comprising the steps of: delivering one or more delivery messages for a first delivery which are extracted from the delivery message database to at least one of the one or more clients, monitoring reading statuses of the one or more delivery messages for the first delivery, generating correlation data indicating correlations between the plurality of delivery messages based on a result of monitoring the reading statuses, and delivering one or more delivery messages for a second delivery which are not included in the one or more delivery messages for a first delivery and are extracted from the delivery message database based on the correlation data.

Preferably, at least one of the plurality of delivery messages in the delivery message database has an expiration date, and the step of delivering one or more delivery messages included in a second delivery group comprises a step of delivering the one or more delivery messages included in a second delivery group on condition that such one or more delivery messages are within the expiration date.

Preferably, the delivery messages for first delivery are delivered as address locations of texts of the delivery messages and the reading statuses are monitored by counting the number of accesses from the one or more clients to the address locations or the texts of the delivery messages.

The present invention has been explained as a method for delivering a plurality of delivery messages in a delivery message database to one or more clients. The present invention can also be understood to be a server, a program or a program product. The program product can include, for example, a storage medium on which the above described program is stored.

It should be noted that the overview of this invention does not enumerate all the features necessary for the invention, and sub-combinations of the features can also constitute the present invention.

According to the present invention, there is provided a method, a system and a program product for delivering on-target messages needed for a user, without omissions.

DETAILED DESCRIPTION OF THE INVENTION

Hereinafter, preferred embodiments according to the present invention will be explained based on the drawings.

Figure 1:
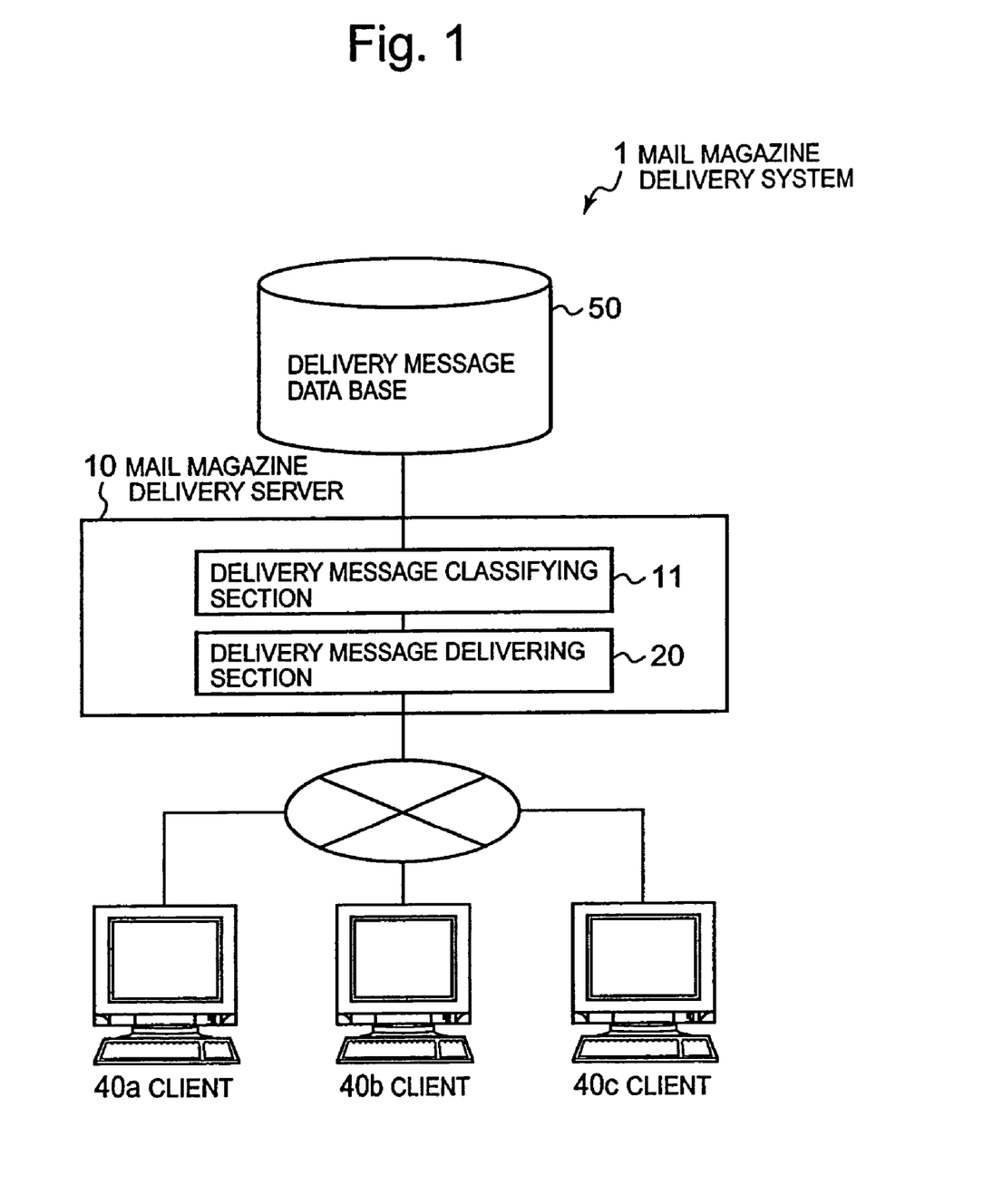
FIG. 1 is a diagram showing a system configuration of a mail magazine delivery system.

FIG. 1 is an example showing a configuration of a mail magazine delivery system 1. The mail magazine delivery system 1 includes a delivery message database 50 on which information delivered as a mail magazine (delivery message) is recorded, a mail magazine delivery server 10 for delivering the delivery message recorded on the delivery message database 50 to clients 40a to 40c as the mail magazines, and the clients 40a to 40c. A connection between the mail magazine delivery server 10 and the clients 40a to 40c in the mail magazine delivery system 1 is connected via communication line networks. As the communication line network, a general public network, the Internet, an exclusive line may be used, and networks composed of any combinations between them may be used.

The mail magazine delivery server 10 delivers the delivery message to the clients 40a to 40c. Here, the message to be delivered (delivery message) is activated by the clients 40a to 40c, which is receivable and readable using normal mail software, and may include characters, images, and link information to a predetermined address location. The delivery message in this specification is a message on one piece of information. In other words, the mail magazine including one or more pieces of information is composed of one or more delivery messages including one piece of information. The mail magazine delivery server 10 delivers the mail magazine. It should be noted that, in the following description, upon delivering the message, modes of delivering the message as the mail magazine are explained, but the present invention is not limited to using the mail magazine.

The delivery message database 50 is a database for recording the delivery message to be delivered to the client's 40a to 40c. The delivery message to be recorded may include news articles that are topical information, reports on recent events, reports on new products, or the like. Here, when a part of the delivery messages are delivered to the client's 40a to 40c as the mail magazines, the expiration date indicating a deliverable period is set thereto. That is to say, the expiration dates corresponding to individual fixed-term delivery messages are recorded on the delivery message database 50. In other words, the delivery messages are classified into a group of delivery messages which are delivered in a single-shot (single-shot delivery message), and a group of delivery messages which are delivered at multiple times if the messages are within the expiration date (fixed-term message). Here, execution of the delivery by multiple times means to execute the delivery to other clients in timely basis that follows the second delivery (within the expiration date), when it was possible to deliver to a part of the clients at the time of the first delivery but not possible to deliver to other clients.

The mail magazine delivery server 10 includes a delivery message classifying section 11 and a delivery message delivering section 20. The delivery message classifying section 11 classifies the delivery messages recorded on the delivery message database 50 into the single-shot delivery message and the fixed-term delivery message. The mail magazine delivery server 10 receives an input about the expiration date corresponding to the individual fixed-term delivery messages, and records the received expiration date on the delivery message database 50 correlating with the fixed-term delivery messages. When delivering the delivery message as the mail magazine, the delivery message classifying section 11 determines whether the individual delivery message is the fixed-term delivery message or the single-shot delivery message, and classifies the delivery messages to be delivered into the fixed-term delivery message and the single-shot delivery message.

The delivering section 20 delivers an appropriate delivery message between the delivery messages classified by the delivery message classifying section 11, to the clients 40a to 40c via the communication line network. The delivering section 20 includes a delivery message selecting section 21 for selecting the delivery message to be delivered, a regulation recording section 23 referenced at the time of selection, a delivery history recording section 26, a number of requests counting section 30 for counting the number of requests from the clients 40a to 40c, a number of requests recording section 31 for recording the number of requests, a correlation data generating section 32 for generating correlation data based on the number of requests, and a delivery executing section 28 for executing the delivery (refer to FIG. 2).

Figure 2:
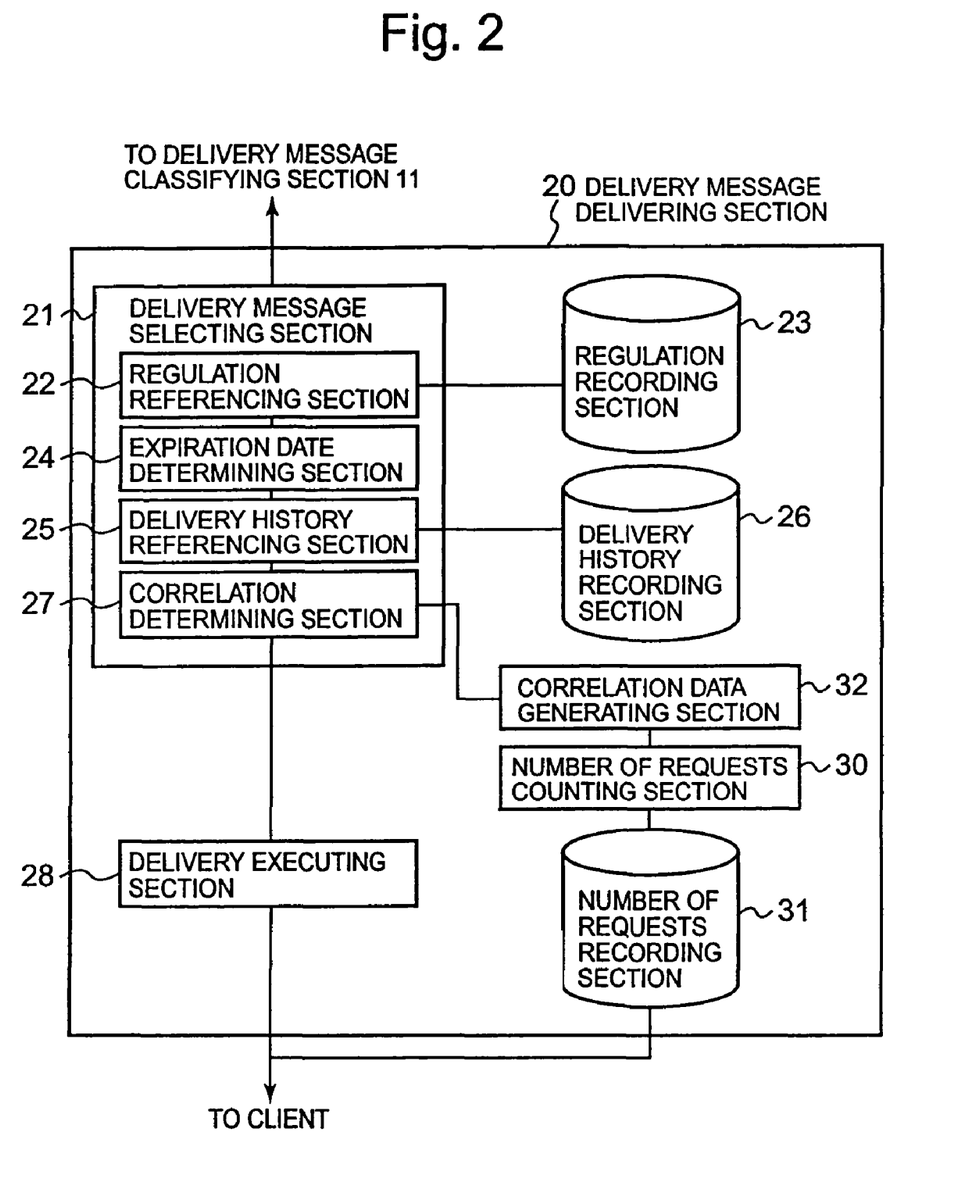
FIG. 2 is a diagram showing a functional block diagram of a delivering section 20.

The delivery message selecting section 21 selects the delivery message to be delivered to the clients 40a to 40c. Here, in selecting the delivery message to be delivered, it is possible to select an appropriate delivery message for the individual clients 40a to 40c, and then to select the delivery message to be delivered only for the corresponding client 40a, or to select the delivery message to be delivered to all of the clients 40a to 40c as targets to be delivered.

The delivery message selecting section 21 includes a regulation referencing section 22 for referencing to a regulation to be selected, an expiration date determining section 24 for determining the expiration date of the fixed-term delivery message, a delivery history referencing section 25 for referencing to a delivery history, and a correlation determining section 27 for determining a correlation. The delivery message selecting section 21 obtains the delivery message from the delivery message database 50, and requests the delivery executing section 28 to deliver the selected delivery message. In response to an instruction of the mail magazine delivery from the user, the delivery message selecting section 21 may select the delivery message and thereby request the delivery executing section 28 to deliver the selected delivery message to the user as the mail magazine. Or, even when there are no instruction from the user, the delivery message selecting section 21 may select the delivery message after a predetermined period elapses and thereby may request the delivery executing section 28 to deliver the selected message to the user.

The regulation referencing section 22 determines whether or not a regulation to be delivered to the client 40a is delivered to the client 40a with reference to the regulation recording section 23. The regulation mentioned here is information which is referenced to in determining whether or not to deliver the regulation to a predetermined client. For example, the regulation is such a regulation pertaining to the delivery that "this delivery message is the one to be delivered to a user A (client 40a) but not a delivery message to be delivered to a User B (client 40b)". More specifically, before delivering the mail magazine, each user registers an interested category (preference category), and the preference category is correlated with the individual delivery message to be delivered. At the time of the delivery, only the delivery message falling under the registered category is then delivered to the user A (client 40a). In other words, information that "since one user A (client 40a) has registered category A and category C, the delivery message belonging to the category A and the category C is delivered" is recorded on the regulation recording section 23, and the regulation referencing section 22, thereby referencing to this regulation, determines whether or not the delivery message to be a delivery target may comply with this regulation. Here, the category is index information for classifying the delivery messages to be delivered.

A mail address for delivering the delivery message to the user (clients 40a to 40c) as the mail magazine is correlated with the user, and recorded on the regulation recording section 23.

When delivering a delivery message scheduled to deliver to the user, the expiration date determining section 24 determines whether or not a delivery time of the fixed-term delivery message is within the expiration date, and determines that the delivery message should be delivered if it is within the expiration date. For example, as for the fixed-term delivery message in which the delivery time is March 2005 and the expiration date is May 2005, the expiration date determining section 24 determines that the fixed-term delivery message is within the expiration date and thereby that the delivery message should be delivered. Here, if the delivery message to be delivered is the single-shot delivery message, the expiration date determining section 24 does not determine in particular.

The delivery history referencing section 25 references the delivery history from the delivery history recording section 26 which records a history that the delivery message has been delivered to one client 40a, and determines whether or not to deliver the delivery message to one client 40*a*. The delivery history recording section 26 records the delivery history that which delivery message was delivered to which client (or registered user) in the past. The delivery history referencing section 25 references to the delivery history. Since the delivery to the client 40*a* has already been completed as a result that the delivery history referencing section 25 has referenced to, it is possible to determine not to deliver this time, but exceptionally possible to determine to perform the second time delivery for the delivery message established so as to desirably deliver again. Contents of the delivered delivery message and an address which is a delivery destination (for example, mail address) of the client 40*a* (user) are recorded on the delivery history recording section 26.

The correlation determining section 27 determines a correlation between a delivery message to be delivered and an already delivered delivery message. In other words, the correlation determining section 27 determines the correlation between the delivery messages by a social filtering. Here, when the correlation determining section 27 determines that the correlation between the delivery message to be delivered and the already delivered delivery message is high, the section 27 determines to deliver the delivery message. For example, based on the result of having monitored the delivery message from the clients 40*b* and 40*c*, the correlation determining section 27 determines the correlation between the delivery message scheduled to be delivered to the client 40*a* and having already been delivered to the clients 40*b* and 40*c*, and other delivery messages having already been delivered to the clients 40*a* to 40*c*. A preferred embodiment will be described later using FIG. 8.

The number of requests counting section 30 monitors the delivery message delivered to the clients 40*a* to 40*c* whether or not the users of the clients 40*a* to 40*c* have read this delivery message. In other words, the number of requests counting section 30 counts the number of requests from the clients 40*a* to 40*c*, and records the number of requests on the number of requests recording section 31. Here, the number of requests is a number of responses from the clients 40*a* to 40*c* regarding the delivered delivery message. That is, the number of requests counting section 30 monitors message reading statuses regarding the delivery message by the users of the clients 40*a* to 40*c*. For example, a summary on the delivery message and an address location of the delivery message may be delivered as the mail magazine. In other words, a text of the delivery message corresponding to this address location (for example, URL (Uniform Resource Locator)) may be provided by an access of a Web browser. As will be understood, when the text of the delivery message is provided, the number of accesses via this Web browser corresponds to the number of requests (as described in FIG. 10 below). When the number of requests counting section 30 counts the number of requests, and receives the reference to the number of requests by the correlation determining section 27, the counting section 30 makes the correlation determining section 27 to refer to the number of requests.

The correlation data generating section 32 generates correlation data in order for the correlation determining section 27 to determine the correlation. In other words, the correlation data generating section 32 generates the correlation data based on the result of monitoring the delivery message previously delivered. Here, the correlation data indicates a correlation between a plurality of delivery messages. For example, when there are many users who read both delivery message A and delivery message B, the correlation between the delivery message A and the delivery message B can be determined to be high. Data used as a parameter for indicating the magnitude of such a correlation are the correlation data.

The delivery executing section 28 delivers one or more delivery messages selected by the delivery message selecting section 21 as the mail magazine. The delivery executing section 28 combines one or more appropriate delivery messages to each of the client's 40*a* to 40*c*, and thereby composes one or more mail magazines and executes the delivery.

The clients 40*a* to 40*c* are terminals to which the delivery message is delivered as the mail magazine. The clients 40*a* to 40*c* are the terminals operated by the users, and the mail addresses for the individual users to receive the mail magazine are recorded thereon. The clients 40*a* to 40*c* may be provided with a function (browser function) for performing a response regarding the delivered delivery message to the mail magazine delivery server 10. Incidentally, the clients 40*a* to 40*c* may be a computer, a personal digital assistant, a mobilephone, or the like.

Figure 3:
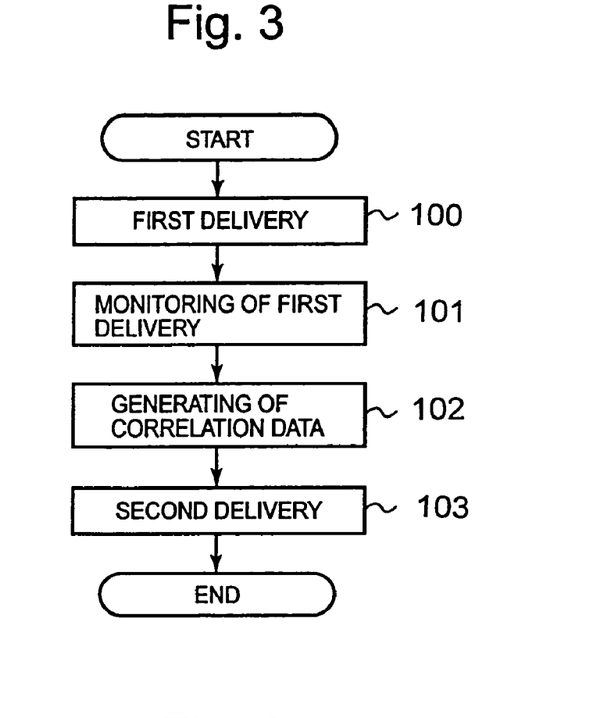
FIG. 3 is a chart showing a main operation flow of the mail magazine delivery system.

FIG. 3 is a chart showing a main operation flow of a mail magazine delivery system. Firstly, the delivering section 20 performs a first delivery (Step 100). Here, the first delivery means to deliver the delivery message nominated as a candidate for read message to all clients of the clients 40*a* to 40*c* for the first time. In other words, the first delivery means to deliver one delivery message to all clients for the first time. Next, the delivering section 20 performs monitoring based on the first delivery (Step 101). That is to say, the section 20 monitors the conditions of reading the delivery message delivered by the first delivery. Next, based on the result of monitoring the reading message conditions, the delivering section 20 generates the data indicating the correlation between the plurality of delivery messages (Step 102). Subsequently, based on the correlation data, the delivering section 20 performs a second delivery for delivering a part of the delivery messages (as candidates for read messages), which are not included in the delivery messages delivered in the first delivery (nominated as the candidates for read messages in the first delivery) (Step 103).

In other words, the mail magazine delivery server 10 monitors the plurality of delivery messages delivered as candidates for read messages in the first delivery, and calculates the correlation between the delivery messages. In the first delivery, since the delivery message nominated as the candidates for read messages is selected under a predetermined regulation, the delivery message which does not fall under the predetermined regulation may not be delivered to the client. However, even if the delivery message was not delivered because of not falling under the predetermined regulation, when users are expected to be interested in the delivery message as a result of monitoring, this delivery message should be delivered. Here, the correlation data are used as a basis for expecting users to get interested in the delivery message. Hereinafter, the procedure will be explained in detail by step.

Figure 4:
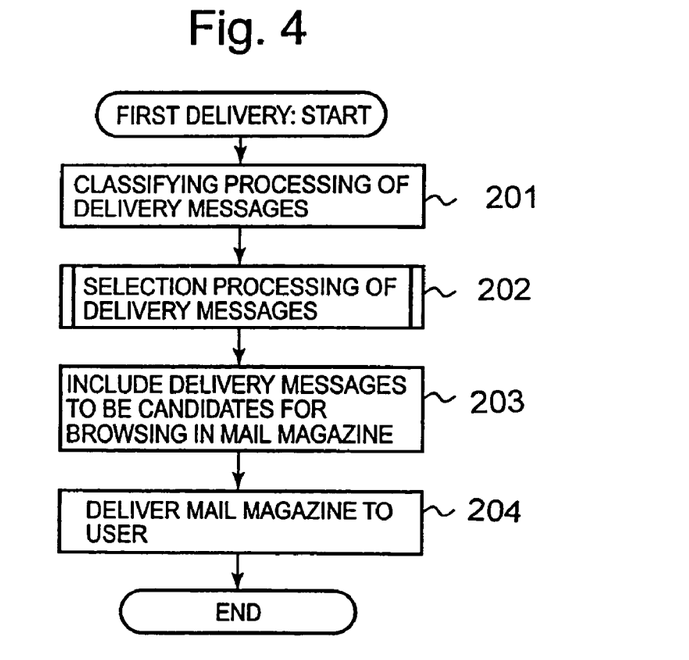
FIG. 4 is a chart showing an operation flow of a first delivery.

FIG. 4 shows an operation flow through which the mail magazine delivery server 10 performs the first delivery. Here, the first delivery means to deliver the delivery message nominated as a candidate for read message to all of the clients 40*a* to 40*c* for the first time. In other words, the first delivery is a delivery of one delivery message performed to all clients for the first time.

Firstly, the delivery message classifying section 11 classifies the delivery messages (Step 201). That is to say, the delivery message classifying section 11 classifies the delivery message to be delivered into either of the group of the single-shot delivery messages or the group of the fixed-term delivery messages. Next, the delivery message selecting section 21 selects the delivery message to be delivered (Step 202). Here, the delivery message being guessed to be read by the delivered user (delivery message nominated as the candidate for read message) is selected. The process of selecting the delivery message will be described later using FIG. 5. Next, the delivery message nominated as the candidate for read message is included in the mail magazine (Step 203). If other delivery messages being scheduled to be delivered are present, it is determined again whether or not these delivery messages should be delivered from Step 201. After the selection of the delivery messages nominated as the candidates for read messages is completed for all delivery messages scheduled to be delivered, the delivery executing section 28 delivers the selected delivery messages to the clients 40a to 40c as the mail magazine (Step 204). Here, the mail magazine delivery server 10 delivers the mail magazine composed of the delivery messages to be delivered, which are combined with the delivery messages including one or more single-shot delivery messages and one or more fixed-term delivery messages, to the clients 40a to 40c.

Figure 5:
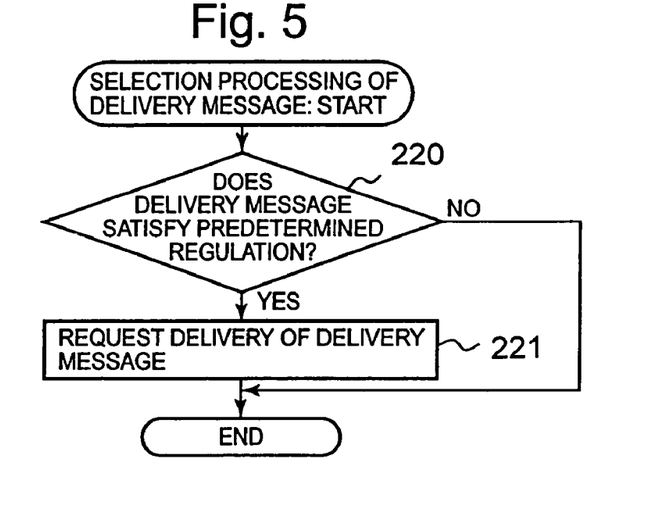
FIG. 5 is a chart showing a selection processing flow of a delivery message.

FIG. 5 shows an operation flow through which the mail magazine delivery server 10 performs the selection processing of the delivery message. Firstly, the regulation referencing section 22 determines whether or not the delivery message to be delivered complies with the predetermined regulation (Step 220). The predetermined regulation here is a regulation for determining whether or not the message should be delivered to the predetermined client 40a as described above. For example, the regulation referencing section 22 determines that the delivery message corresponding to the user's preferences (preference category) that have been registered in advance may comply with the predetermined regulation. The delivery message selecting section 21 requests the delivery executing section 28 to deliver the delivery message determined to be delivered (Step 221).

Here, the delivery of the first delivery may be determined only by the regulation referencing section 22, but even in the first delivery, the delivery may be determined by the expiration date determining section 24 and the delivery history referencing section 25.

Figure 6:
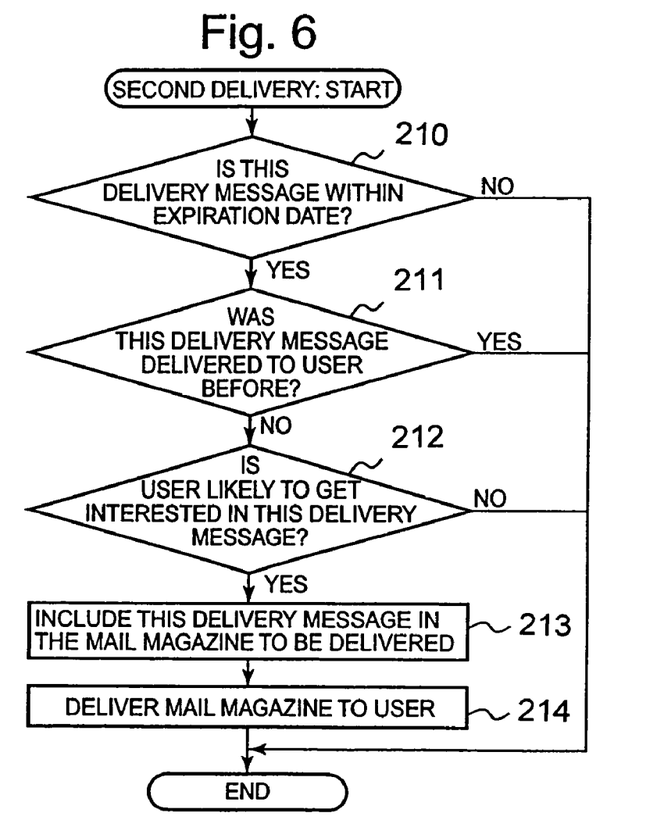
FIG. 6 is a chart showing an operation flow of a second delivery.

Next, an operation flow through which the mail magazine delivery server 10 performs the second delivery will be explained based on FIG. 6. Here, the second delivery means to perform the delivery of the fixed-term delivery message to the client 40a when the delivery has not been performed to one client 40a but the delivery has been performed to other clients 40b and 40c. Firstly, the expiration date determining section 24 determines whether the fixed-term delivery message to be delivered is within the expiration date (Step 210). A next determination is made when the expiration date determining section 24 determines that the fixed-term delivery message to be delivered is within the expiration date, but when the fixed-term delivery message to be delivered is determined not to be within the expiration date, the delivery is not performed, resulting in the process completion.

Next, the delivery history referencing section 25 determines whether the delivery message to be delivered was already delivered to the user (Step 211). When determining that the delivery message to be delivered was already delivered to the user, the delivery history referencing section 25 determines not to deliver the delivery message, while when it is determined that the delivery message to be delivered has not been delivered to the user yet, the correlation determining section 27 determines whether the user is likely to get interested in the delivery message (Step 212). Whether or not the user who is the target of the delivery is likely to get interested in the delivery message which is going to be delivered may be guessed and determined from the result of monitoring the delivery message delivered to the other users. Here, the delivery message passed through Step 10 and Step 11 is the fixed-term delivery message, the delivery message within the expiration date, and the delivery message which is not yet delivered to the user.

The correlation determining section 27 determines whether or not to deliver the delivery message in the second delivery determination processing based on the correlation data generated by the correlation data generating section 32. And when determining to deliver the delivery message (Step 212), the generating section 32 includes the delivery message in the mail magazine to be subsequently delivered (Step 213). After performing the processes from Step 211 to Step 214 for all delivery messages as the delivery targets, a mail magazine including the fixed-term delivery message being determined to be delivered is delivered to the clients 40a to 40c (Step 214).

Figure 7:
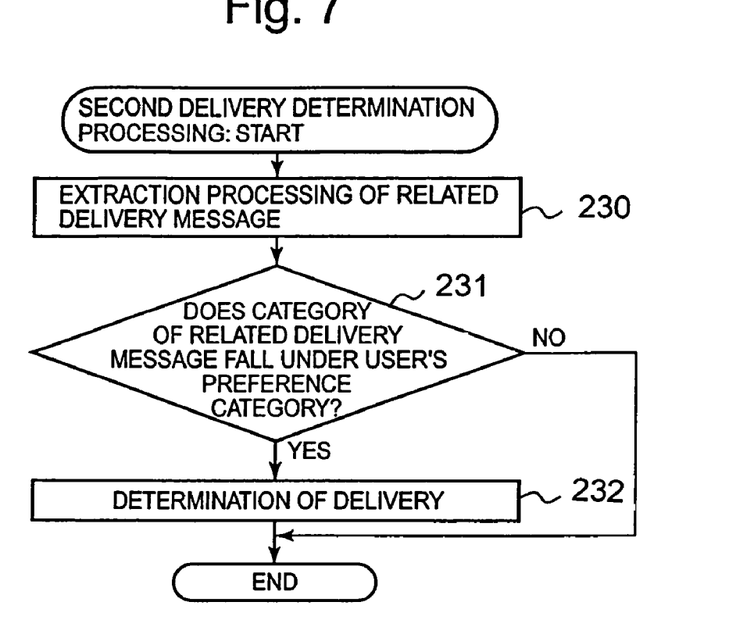
FIG. 7 is a chart showing an operation flow of a second delivery determination processing.

Next, an operation flow for performing the aforementioned second delivery determination processing will be explained based on FIG. 7. The second delivery determination processing is a process for determining whether or not one delivery message is the delivery message in which the user is likely to get interested when performing the second delivery. The correlation determining section 27 performs a process of extracting a related delivery message from the delivery messages delivered in the first delivery (Step 230). Here, the related delivery message is a delivery message having a high correlation with a delivery message to be subsequently delivered and having been delivered in the first delivery. A preferred example will be explained based on FIG. 8 and FIG. 9 as an example using the category. Alice is a user who has registered only the category 1 as a preference category, and has not registered other categories 2 to 4 (refer to FIG. 9). As a result, in the first delivery, only the delivery message belonging to the category 1 is delivered to Alice as the mail magazine.

Next, the mail magazine delivery server 10 performs the second delivery to a delivery message X. At this moment, the delivery message X has not been delivered as the mail magazine to Alice at the time of the first delivery, but has been delivered as the mail magazine to the users that are not Alice and have registered the category 4 as a preference category. Since the delivery message X is within the expiration date, it is determined whether or not the delivery message X should be delivered to Alice. The correlation determining section 27 extracts a delivery message having a high correlation with the delivery message X (related delivery message) (Step 230).

Figure 8:
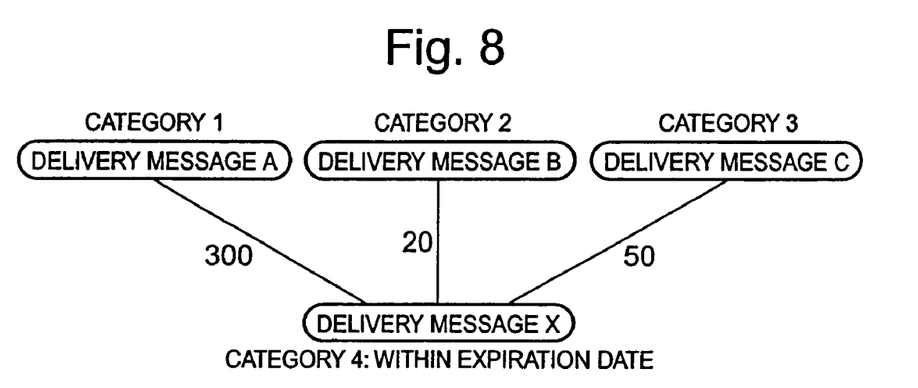
FIG. 8 is a diagram showing extraction processing of a related delivery message.
Figure 9:
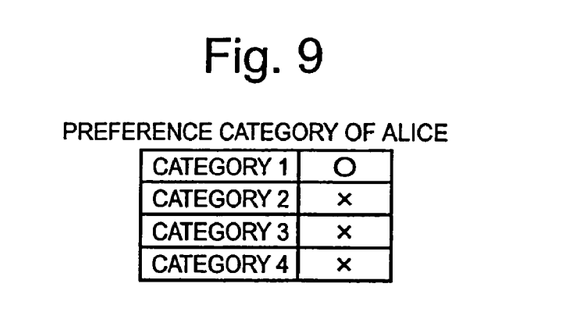
FIG. 9 is a table showing a category registered by a user.

If based on FIG. 8, the delivery messages A, B and C delivered in the first delivery fall under the categories 1, 2 and 3, respectively. In order for the correlation determining section 27 to determine the correlation between these delivery messages A, B and C, and the delivery message X, the correlation data generating section 32 generates data indicating the correlation between them. Numeric characters described on lines for connecting elements of respective delivery messages shown in FIG. 8 indicate the numbers of requests from the users. The number of requests counting section 30 measures the number of request of each delivery message, and the correlation data generating section 32 generates data for seeking the correlation based on the number of requests corresponding to each delivery message. In other words, as the number of requests regarding the delivery messages from the users (clients 40a to 40c), the number of requests counting section 30 counts the number of requests of both delivery message A and the delivery message X. When the same user then requests both the delivery message A and the delivery message X, the correlation data generating section 32 counts the request. For example, in FIG. 8, a number of requests of both delivery message A and delivery message X presented by the same user is 300, a number of both delivery message B and delivery message X presented by the same user is 20, and a number of requests of both delivery message C and delivery message X presented by the same user is 50. In this example, the numbers of requests of 300, 20 and 50 fall under the correlation data.

On the basis of the result, the correlation determining section 27 determines that a delivery message having a high correlation with the delivery message X is the delivery message A. In other words, the correlation determining section 27 extracts the delivery message A as the related delivery message. Next, it is determined whether or not the extracted related delivery message falls under the user's preference category (Step 231). Here, since the related delivery message A falls under the category 1, it falls under the preference category of Alice. Consequently, it is determined to deliver the delivery message X (delivery message) as the mail magazine (Step 232).

Here, since the preference category is a preference of the user operating the clients 40a to 40c, it may be updated according to each user's preference as needed. For example, one user requests a text from the delivered address location. The number of requests of the delivery messages is then counted. As described above, categories having a large number of requests between the numbers of requests counted for the plurality of delivery messages may be updated as preference categories.

Figure 10:
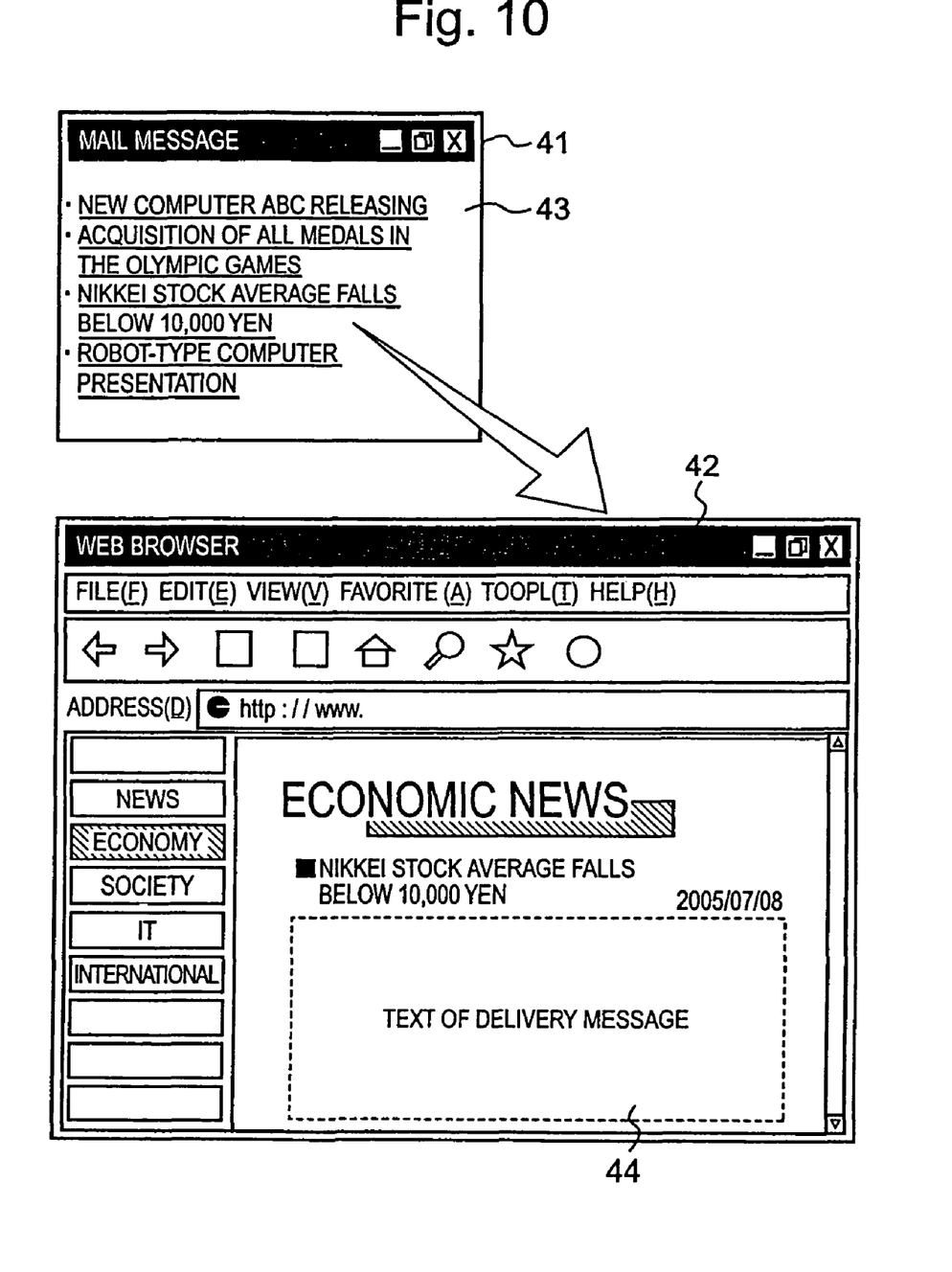
FIG. 10 is a view showing an example of a screen display of a mail message and a browser received by clients.

FIG. 10 is a display example displayed on the clients 40a to 40c. As shown in FIG. 10, a mail message 41 delivered to the clients 40a to 40c may include a summary 43 of the delivery message and an address location correlated with the summary 43, but may not necessarily include a text. When there is a request for the text from the user, a text 44 of each delivery message may be displayed on the clients 40a to 40c by being linked from the address location correlated with the summary 43 of the individual delivery message displayed in the mail message 41. Here, the address location is URL, and in displaying the text of the delivery message, the text of the delivery message may be downloaded from the mail magazine delivery server 10 based on the address location and may be presented by a Web browser 42 activated by the client 40a. Here, the number of requests counting section 30 may count the number of requests for the text and thereby may record it on the number of requests recording section 31. When the summary of the delivery message and the text of the delivery message are individually presented to the user, the summary and the text are individually recorded on the delivery message database 50. Further, in this case, the delivery executing section 28 delivers only the summary of the delivery message selected to be delivered to the clients 40a to 40c as the mail magazine, and for the request for the text from the user, the delivery executing section 28 delivers the text of the corresponding delivery message to the client 40a that requested the text.

Figure 11:
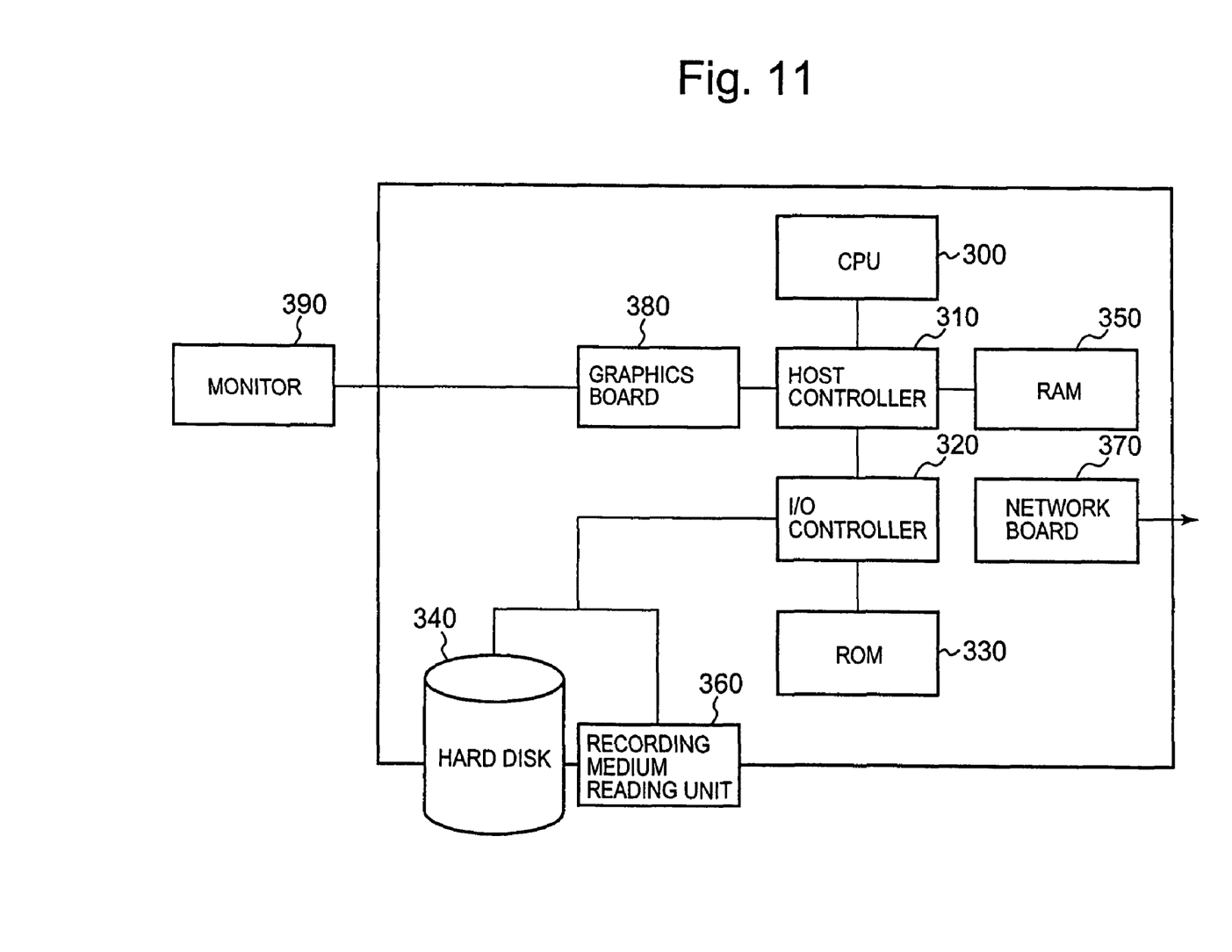
FIG. 11 is a diagram showing an example of a hardware configuration of a mail magazine delivery server or that of the client.

FIG. 11 is a diagram showing an example of a hardware configuration of the mail magazine delivery server 10 and that of the clients 40a to 40c. A CPU 300 reads a program for executing the mail magazine delivery from a hard disk 340 or a recording medium reading unit 360 through a host controller 310 and an I/O controller 320, and stores the read program in a RAM 350 and thereby executes the program. By executing each step composing the program, the CPU 300 may serve as the delivery message classifying section 11 and the delivery message selecting section 21. In addition, when executing the program, the CPU 300 may read data stored in the hard disk 340, ROM 330, and the recording medium reading unit 360. The CPU 300 displays a determination result or an operation result on a monitor 390 through a host controller 310. The CPU 300 obtains data from the mail magazine delivery server 10 or the clients 40a to 40c connected to the communication network via a network board 370 and the I/O controller 320. The CPU 300 of each of the clients 40a to 40c may display a display example shown in FIG. 10 on a monitor 390 through a graphics board 380.

It is possible to realize a mail magazine delivering method of achieving such an embodiment by a program to be executed in a computer or a server. As storage media for this program, an optical storage medium, a tape medium, a semiconductor memory, or the like can be cited. Moreover, the program may be provided via the network by using a memory device, such as a hard disk, a RAM, or the like provided in a server system connected to a private telecommunication network or the Internet as the storage medium.

As is clear from the aforementioned description, in accordance with the mail magazine delivering method, the program, and the server according to the present invention, it is possible to receive the delivery message meeting the user's needs by the first delivery, and possible to receive the delivery message which was not delivered in the delivery by the normal first delivery, as the second delivery. Therefore, it is possible to realize the delivery of the mail magazine without any omission for one user.

As mentioned above, the embodiments according to the present invention have been explained, however, said embodiments are only specifically exemplified, and do not limit the present invention in particular. Moreover, the advantages described in the embodiments of the present invention are the most preferred advantages that were only enumerated out of advantages produced by the present invention, and the advantages according to the present invention are not limited to the advantages described in the embodiments of the present invention.

The invention claimed is:

1. A method for delivering a plurality of delivery messages to one or more clients, wherein a server comprises the steps of:
    correlating the plurality of messages with one or more categories;
    delivering first reading candidates as address locations of texts of the one or more first delivery messages correlated with the categories, which are categories set per client and matched with a user preference operating the client, to the client(s);
    monitoring reading statuses of the first delivery messages by collecting the number of accesses to the address location from the client(s) who have received the first reading candidates by the server;
    generating data by the number of clients who have read the plurality of first delivery messages indicating correlations between/among the plurality of first delivery messages based on a result of monitoring the reading statuses; and
    delivering second reading candidates that are the address locations of the texts of second delivery messages unmatched with the user preference, based on the client number of data, wherein determining whether to deliver the second delivery messages is based on the correlation of the first delivery messages with the categories,
    wherein the server comprises a step of updating the categories set per client to be delivered, according to the number of accesses to the address locations of the texts of the monitored first delivery messages.

2. The method according to claim 1, wherein
at least a part of the plurality of the first delivery messages have an expiration date, and
in the delivering step based on the client number of data, when the second reading candidates, which are address locations of the texts of the second delivery messages, the second reading candidates are delivered on condition that the second delivery messages are within the expiration date.

3. The method according to claim 1, wherein
in the monitoring step, the reading statuses of the first delivery messages are monitored by collecting the accessed number to the address locations by the plurality of clients who have received the first reading candidates, by the sever; and
in the generating step, the client number of data, the clients having read the plurality of the first delivery messages, indicating the correlations between/among the plurality of the first delivery messages based on the monitoring result of the reading statuses of the first delivery messages by the plurality of clients.

4. The method according to claim 1, wherein
the delivery of the first reading candidates in the step of delivering based on the delivering step and the client number of data is to deliver summaries of the first delivery messages in addition to the address locations of the texts of the first delivery messages.

5. The method according claim 1, wherein
in the monitoring step, the reading statuses of the first delivery messages are monitored by collecting the number of requests from the clients to the texts of the first delivery messages, by the server.

\* \* \* \* \*